(12) United States Patent
Sherman

(10) Patent No.: US 6,355,900 B1
(45) Date of Patent: Mar. 12, 2002

(54) NUT POSITION SENSING WELD POINT

(76) Inventor: Darrell Sherman, 3105 Monroe Rd., Greeneville, MI (US) 48838

( * ) Notice: Subject to any disclaimer, the term of this patent is extended or adjusted under 35 U.S.C. 154(b) by 0 days.

(21) Appl. No.: 09/660,594

(22) Filed: Sep. 13, 2000

Related U.S. Application Data

(60) Provisional application No. 60/197,948, filed on Apr. 17, 2000.

(51) Int. Cl.⁷ .............................................. B23K 11/14
(52) U.S. Cl. ..................... 219/117.1; 219/120
(58) Field of Search .............................. 219/117.1, 119, 219/120, 78.01, 93

(56) References Cited

U.S. PATENT DOCUMENTS

| | | | | |
|---|---|---|---|---|
| 3,219,790 A | * | 11/1965 | Johnson | 219/93 |
| 3,573,423 A | * | 4/1971 | Medlin | 219/119 |
| 4,609,805 A | | 9/1986 | Tobita et al. | 219/93 |
| 4,754,116 A | | 6/1988 | Naruse et al. | 219/78.01 |
| 5,471,029 A | * | 11/1995 | Simmons | 219/120 |
| 5,632,912 A | * | 5/1997 | Cecil | 219/117.1 |

* cited by examiner

*Primary Examiner*—Clifford C. Shaw
(74) *Attorney, Agent, or Firm*—Christopher J. Whewell

(57) ABSTRACT

Provided herein is a weld point electrode useful for welding weld nuts to various selected substrates. Through use of the device of this invention, a process for attaching weld nuts to a substrate may be made more efficient than such processes according to the

21 Claims, 3 Drawing Sheets

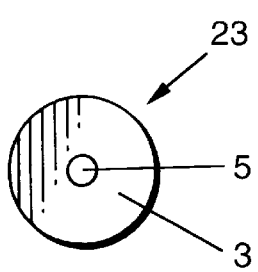
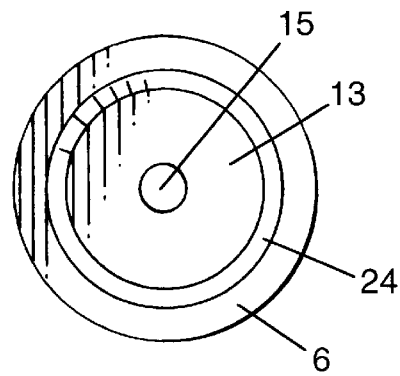
FIG. 2A PRIOR ART
FIG. 2B
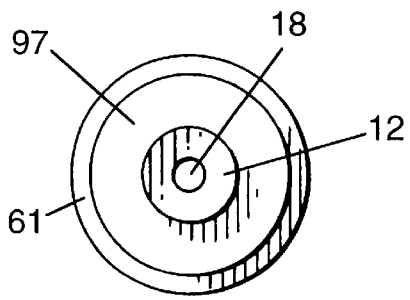
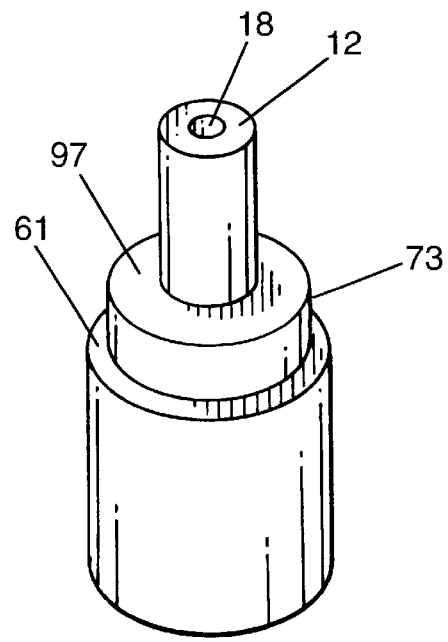
FIG. 3A
FIG. 3B

NUT POSITION SENSING WELD POINT

CROSS REFERENCE TO RELATED APPLICATIONS

This invention claims priority to provisional patent application Ser. No. 60/197,948 filed Apr. 17, 2000 which is currently still pending and which application is incorporated fully herein by reference thereto.

FIELD OF THE INVENTION

This invention relates to an electrode useful in welding. More particularly, it relates to welding a welding nut to a desired metallic substrate.

BACKGROUND

Projection weld nuts are well known in the art and are generally composed of a metallic element or alloy in the shape of a section of a hollow cylinder, and are thus reminiscent in general shape of a donut, having tiny protrusions or projection points on one of their faces. In general, a weld nut is beneficially applied to reinforce the area around a hole in a piece of sheet metal, which hole in the sheet metal is intended to receive a fastener, such as a bolt. Such reinforcement prevents failure of the sheet metal in the areas adjacent to the fastener when the sheet metal is subjected to physical stress. A weld nut is typically applied to a flat metallic substrate by placing it onto the surface of the substrate at a desired location and connecting one pole of a source of direct electrical current to the metallic substrate. The other pole of the source of direct electrical current is applied to the metallic weld nut, usually under a clamping force and through an electrode which contacts the weld nut. Then a sufficient amount of electrical current is caused to flow through the weld nut and to the flat substrate, which causes the weld nut to be fused or welded to the metallic substrate.

In commercial practice the "projection welding" of weld nuts (as the procedure is commonly referred to) involves the positioning of the conductive metallic substrate so that the nut will be welded over a guide pin that protrudes from the lower electrode, and then manually or automatically placing the weld nut over the pin and on top of the part. A second electrode is then advanced, typically by a pneumatic cylinder, to apply pressure that squeezes the pieces together. Intensification, a process of increasing the pressure applied after the weld points (electrodes) are closed is often employed. Electric current is then passed through the weld points and through the nut and substrate causing heat to develop between the contact areas of the projections of the steel nut and the steel part. The heat fuses the nut to the part at the projection points of the nut.

A main requirement of the success of the process described above is that the weld nut must be in its proper desired position when the electrical current is applied, for when it is not, such situation may create a finished product that is unsuitable for its intended use by virtue of the weld nut being in an incorrect position. Such mis-alignment may lead to the weld nut being welded out of center with respect to the hole in the substrate, or to only one portion of the circumference of the weld nut being welded to the substrate and partially covering the hole intended to be used to receive a fastener.

A problem solved by using a nut position sensing weld point according the present invention is the elimination of the welding of weld nuts that are not properly placed over the hole in the substrate and are otherwise welded out of location. Through use of the present invention the proper positioning of the weld nut on the substrate prior to the flow of the electrical current is provided, and the possibility of a weld occurring when the weld nut is not in proper position is precluded. Thus, through use of the invention, scrap is greatly minimized.

SUMMARY OF THE INVENTION

According to the invention, there is provided an upper electrode which includes a non-conductive portion disposed about the outer circumference of the upper electrode's lower surface that normally contacts and supplies the weld nut with electrical current. The non-conductive portion extends below the bottom of the upper electrode's contact surface so as to block contact between the upper electrode and an out-of-position weld nut, thus blocking current flow to mis-aligned weld nuts. A control system used in association with the welding apparatus is capable of responding to the decrease in current flowing in a given process cycle, and may be tailored to alter the process, such as rejecting the part as bad, using electronic means known in the art. The height location of the upper electrode may also be monitored electronically to stop the process even before welding is attempted.

The leading edge of the outer ring of the non-conductive portion may take on any number of physical configurations, such as conical, to funnel a weld nut that is only slightly out of position into its proper desired position so as to assist in increasing the number of successful welds, as well as detect those weld nuts which are too far out to correct. In order to withstand the forces involved with vertical intensification and lateral aligning, it is advantageous that the non-conductive portion be made of a durable, nonconductive conductive material, such as a hard polymer.

In one form of the invention, the non-conductive portion is a hollow cylindrical collar which has a diameter slightly greater than the conductive upper electrode itself and is thus adapted to be interference fit about the outer electrode. In order to prevent the collar from sliding up the upper electrode in such an embodiment, the conductive portion of the upper electrode should be formed with a shoulder the same width as the nonconductive collar so as to give a solid point for the insulator to bear against. The material can also be easily removed to allow for close clearance in special applications. The shoulder that the collar bears against may also be conically shaped to stop outward expansion during intensification on top of a nut. A square shoulder may also be advantageously employed. The collar should be a light press fit so it remains in position but could still be removed for inspection, replacement, or cleaning.

Thus, an upper electrode according to one preferred form of the invention comprises a cylindrically-shaped metallic core portion, the core portion including a base portion having a bottom portion comprising a flat surface, and a tower portion having a top portion. There is a non-conductive outer sleeve portion in the form of a cylindrical shell having an inner diameter, an outer diameter, an upper portion, and a flat lower portion wherein the outer sleeve portion is coextensively disposed about a predominant amount of the base portion along its length dimension and wherein the lower portion of the sleeve portion extends beyond the flat surface portion of the bottom portion of the core portion, and further comprising a bevel annularly disposed about the inner diameter portion of the lower portion of the sleeve portion. The top portion of the tower portion includes a first hole drilled in its center along the centerline of the core portion, and wherein the flat surface portion includes a second hole drilled at its center along the centerline of the core portion, the first hole and the second hole not drilled through to connect with one another.

Brief Description of Drawings

In the annexed drawings:

FIG. 2A is a bottom view of a weld point electrode according to the prior art;

FIG. 2B is a bottom view of a weld point electrode according to the present invention;

FIG. 3A is a top view of a weld point electrode according to the present invention;

FIG. 3B is a perspective view of a weld point electrode according to the present invention;

DETAILED DESCRIPTION

Figure 1B:
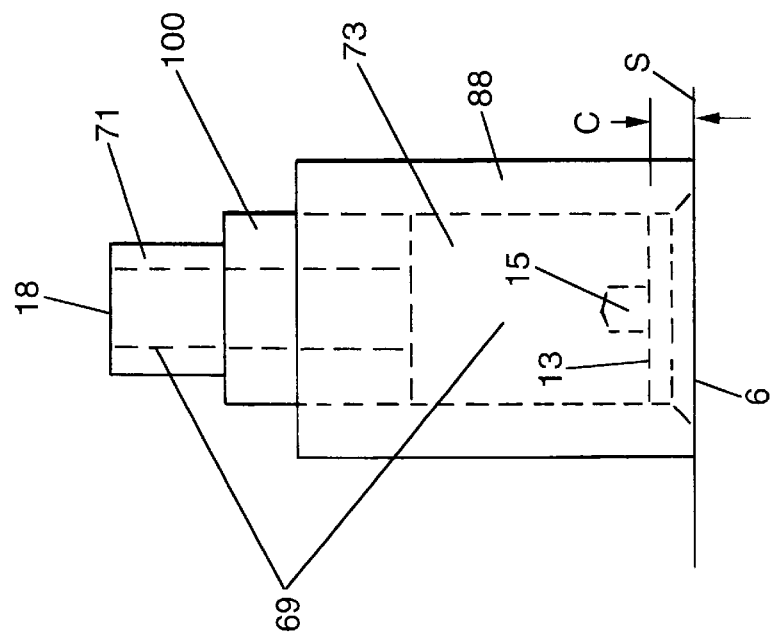
FIG. 1B is a side view of a weld point electrode according to the present invention.
Figure 1A:
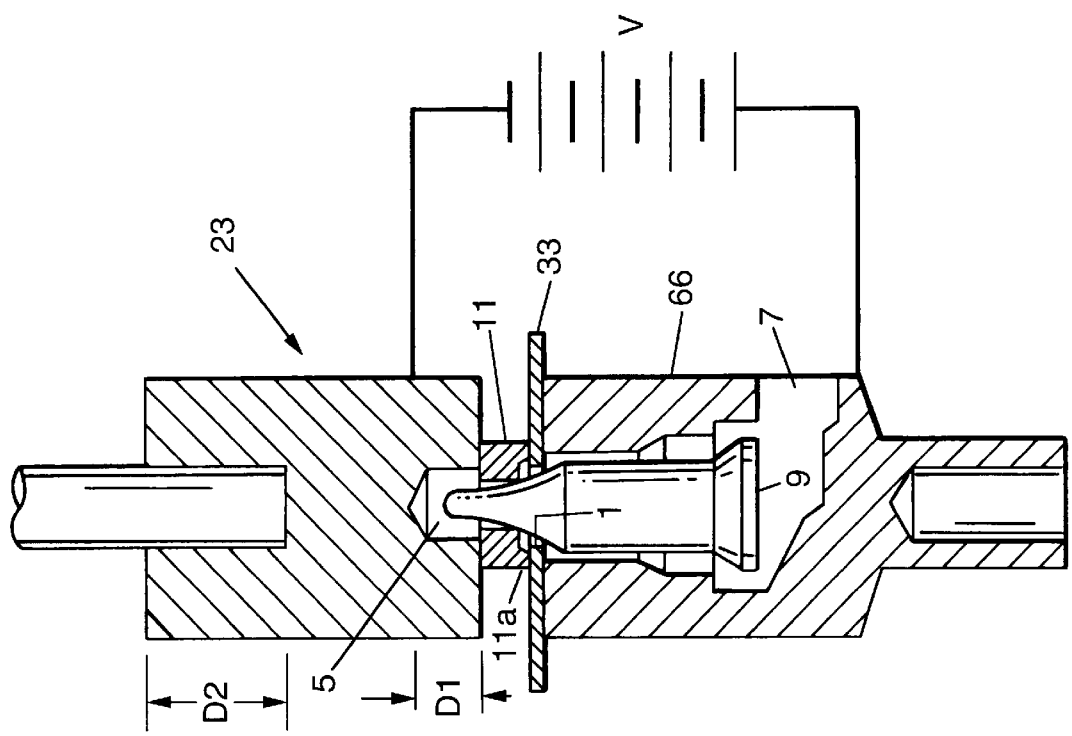
FIG. 1A is a side view of a weld point electrode in its work position along with other associated wares used in its employment according to the prior art.

Referring first to FIG. 1A, there is shown a side perspective view of a conventional prior art welding apparatus that is used to weld a weld nut to a panel employed as a plate material. In this figure is shown a prior art upper electrode 23 in which the entire construction of the upper electrode 23 is a conductive metallic element, preferably copper. The construction of FIG. 1A includes a hole portion 5 drilled in center of the bottom to a depth D1 to accommodate the pin 9, and a coolant passage drilled in the center of the top (not shown). A panel 33, which has previously been drilled or otherwise formed to include a bolt-receiving bore 1 about which it is desired to secure a weld nut, is placed on a lower electrode 66 and properly positioned about an optional guide pin 9 that projects upwardly from the bore 1 of the panel 3, which guide pin may be upwardly biased by means of compressed air supplied from an air inlet 7 provided in the lower electrode 66. Thus, the guide pin 9 may enable the panel 33 to be properly positioned on the lower electrode 66. A weld nut 11 is placed on the panel 33 over the guide pin 9, and the weld nut 11 and the panel 33 are pressed between the upper electrode 23 and the lower electrode 66 in such a manner as to be clamped therebetween. Thereafter, current is supplied to the weld nut 11 and the panel 33 from a current source V that is connected to the upper electrode 23 and lower electrode 66, whereby the weld nut 11 is welded to the panel 33. It is to be noted that the reference numeral 11a in FIG. 1 denotes a projection on the weld nut, as such projections are common for weld nuts used in such applications.

FIG. 1B shows a phantom view of a weld point electrode according to the invention, including the non-conductive outer sleeve portion 88 which in one embodiment exists in the form of a hollow cylindrical shell within which the outer surface of the core portion 69 (which is preferably shaped like a cylinder) is disposed in tight fit within the inner surface of the outer sleeve portion. The core portion 69 includes a base portion 73 and a tower portion 71, which tower portion is also substantially cylindrically shaped, wherein in a preferred form of the invention the core portion and the tower portion are of a common casting, or may be machined from the same piece of billet stock. There is a hole 15 drilled in the center of the bottom portion of the base portion to a depth similar to D1 of FIG. 1A, and there is a hole 18 drilled in the center of the tower portion to a depth of D2 to assist in cooling by its ability to receive a conventional fluid material recognized as a coolant by those in the art.

According to the construction of the article according to the invention shown in FIG. 1B, it is clear that the outer sleeve portion extends beyond the bottom surface of the core portion so as to not permit the bottom surface 13 of the conductive core to come into contact with a surface upon which said electrode construction is caused to be contacted, such as surface S. The distance C represents the distance which the bottom surface of the conductive core is separated from the surface S, and this distance is dependent upon the distance which the lower portion of the non-conductive outer sleeve extends beyond the lower surface of the conductive core portion. While this distance must at its minimum only equal to at least an effective distance for not permitting contact between the lower surface of the conductive core and the substrate, it is preferable that the distance C be equal to any distance between 50% of the thickness of the weld nuts being used and the thickness of the weld nuts being used, including every thickness value therebetween. Welding nuts generally include projections, such as 11a in FIG. 1A. The projections are generally not visible after the welding process and all that is visible is the thickest portion of the weld nut sitting atop a substrate to which it has been welded. Such a construction makes the weld nut appear like a donut resting atop the substrate wherein the top surface of the weld nut is located at a certain distance from the substrate. It is most preferred that the distance C be equal to the distance that the top surface of the weld nut in a finished weld is located from the substrate.

FIG. 2A shows the bottom portion of a weld point electrode 23 according to the prior art having a flat bottom surface 3 and a hole 5 drilled in its center to depth D1.

FIG. 2B shows the bottom portion of a weld point electrode according to a preferred form of the present invention having a flat bottom surface 13 and a hole 15 drilled in its center to an approximate depth of D1. There is a flat portion 6 of the bottom portion of the non-conductive outer sleeve portion, and an annular bevel 24 about the inner diameter of the outer sleeve portion at the bottom of the outer sleeve portion, wherein the flat surface 13 in this figure is at lower relief than surface 6 with respect to the eye of the viewer.

FIG. 3A is a top view of a weld point electrode according to a preferred form of the present invention showing the location of hole 18, the top surface of the outer sleeve portion 61, the top surface of the tower portion 12, and the top surface portion 97 of the core portion.

FIG. 3B is a perspective view of an electrode according to a preferred form of the present invention showing the location of hole 18, the top surface of the outer sleeve portion 61, the top surface of the tower portion 12, and the top surface portion 97 of the core portion, and the base portion 73 of the core portion 69, which core portion comprises both said base portion 73 and said tower portion, as was shown in a different view in FIG. 1B.

Figure 4A:
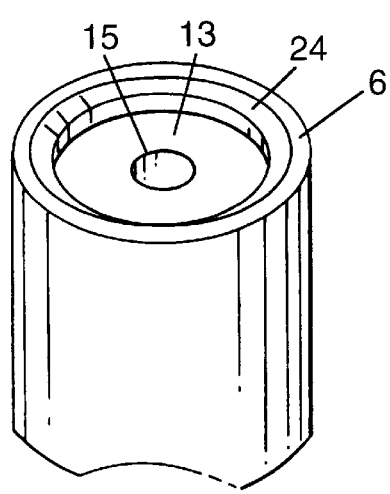
FIG. 4 is a perspective view of the bottom portion of a weld point electrode according to the invention.
FIG. 4B is a side view of the bottom portion of a weld point electrode according to the invention.

FIG. 4 shows a side perspective view of the bottom portion of an electrode according to one form of the present invention, showing the bottom surface 6 of the nonconductive outer sleeve portion, hole 15, the flat surface portion 13 of the lower portion of the core portion 73, and the annular bevel 24 machined on the outer sleeve portion.

Figure 4B:
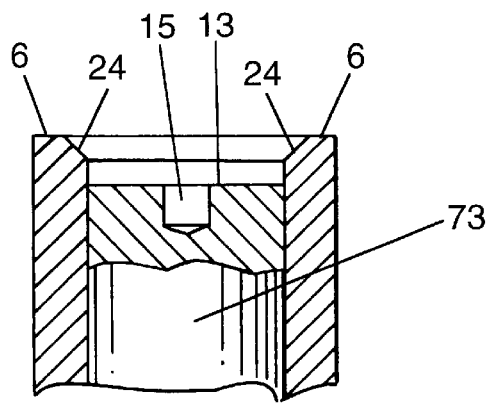
Figure 5:
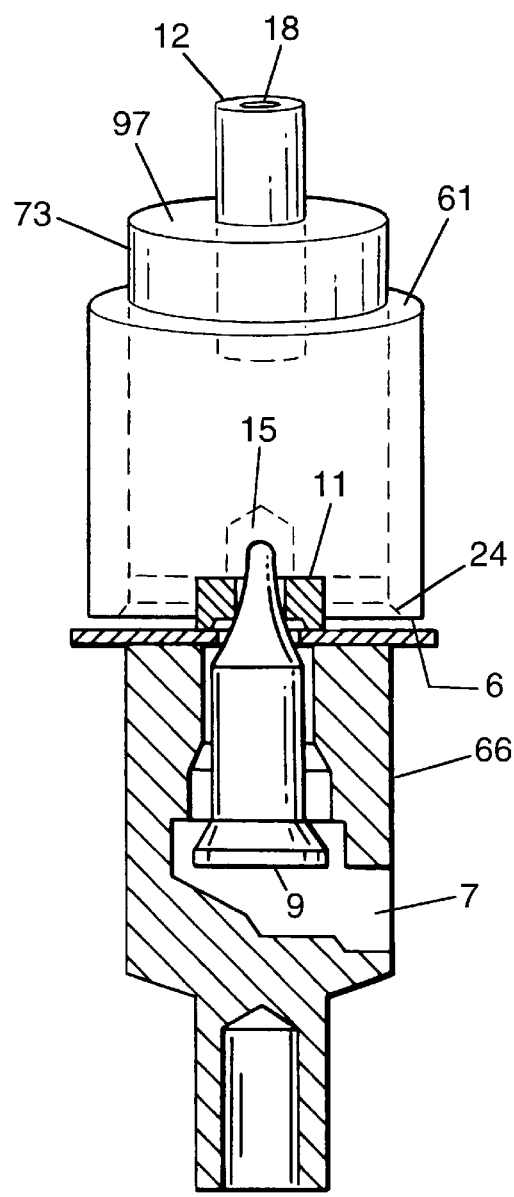
FIG. 5 is a side view of a weld point electrode in its work position along with other associated wares used in its employment according to the invention.

FIG. 4B is a cutaway view of the bottom portion of a weld point electrode according to the present invention, showing the bottom surface 6 of the non-conductive outer sleeve portion, hole 15, the flat surface portion 13 of the lower portion of the core portion, the annular bevel 24 machined on the outer sleeve portion, and the base portion 73 of the core portion 69.

An advantage of the invention is that when a nut is not in its correct position for welding to the substrate, the non-conductive collar is the only portion which comes into contact with the weld nut, and it is thus not possible for current to flow in an automated process which uses an electrode according to this invention. A current sensing means could be used to alter the process through a controller as the use of such are well known in the art. In a preferred form of the invention, the surface 100 of the base portion of the core portion is concave as shown FIG. 1B. This arrangement provides for the concave shoulder seat to stop spread under force.

The outer sleeve portion may be constructed of any material recognized by those in the electrical arts as being non-conductive, including without limitation polymeric materials, wood, cloth, paper, etc. Polymeric materials include without limitation polyolefin homopolymers and copolymers, graft copolymers, SBS polymers, or any other material recognized by those skilled in the polymer arts as being a polymeric material that is formed from the polymerization of one or more monomers in a polymerization reaction.

The conductive core portion of the invention may be any material which is recognized by those in the electrical arts as conducting electricity such as any metal in the periodic table of the elements. It is preferred that the conductive core portion be comprised of a metal or alloy having a low electrical resistance, and pure copper is especially preferred, while silver and alloys of copper such as brass or bronze are, without limitation, also useful herein.

It is most preferable that the diameter of the inner hollow portion of the outer sleeve be equal to only slightly less than the outer diameter dimension of the conductive core, to enable the outer sleeve to be disposed about the core in an interference fit, as interference fits are well known to those skilled in the art. The degree of interference of the interference fit used is preferably enough to withstand the normal clamping pressure applied to the electrode during the welding process without any shifting of the core portion within the sleeve portion.

An additional unexpected benefit of an outer sleeve according to the invention is that it prevents against current shunting through the side of the upper electrode (as may happen in the case of a conventional upper electrode) by stopping any unintentional contact between the side of the upper electrode and the substrate, which can sometimes occur when the weld nut is properly positioned with respect to the welding apparatus as a whole, but the substrate is not. Such may occur, as but one example, in situations such as when it is desired to attach a weld nut to a substrates in a location adjacent to a 90 degree flange protruding upwards from the substrate, wherein the 90 degree flange has a stiffener flange turned toward the upper electrode.

Although the present invention has been shown and described with respect to certain preferred embodiments, it is obvious that equivalent alterations and modifications will occur to others skilled in the art upon the reading and understanding of the specification. The present invention includes all such equivalent alterations and modifications, including the use of alternating current (AC) in places where direct current (DC) was mentioned, and is limited only by the scope of the claims which now follow.

I claim:

1. An electrode construction useful in the welding of weld nuts to substrates which comprises:
    a) an electrically conductive core portion having a bottom surface which is adapted to contact a weld nut; and
    b) a non-conductive outer sleeve portion,
wherein said outer sleeve portion is coextensively disposed about the conductive core portion along the length dimension of said core portion, and wherein said outer sleeve portion extends beyond said bottom surface of said core portion an effective distance for precluding the bottom surface of the conductive core to come into contact with a surface upon which said electrode construction is caused to be contacted.

2. An electrode according to claim 1 wherein said distance is equal to between 0.050 inches and 2.00 inches, including every hundredth inch therebetween.

3. An electrode according to claim 1 wherein said core portion comprises copper.

4. An electrode according to claim 1 wherein said outer sleeve portion comprises a polymeric material.

5. An electrode according to claim 1 wherein said core portion includes a hollow passage which is adapted to receive a liquid coolant.

6. A weld point electrode which comprises:
    a) a cylindrically-shaped metallic core portion, said core portion including a base portion having a bottom portion comprising a flat surface, and a tower portion having a top portion;
    b) a non-conductive outer sleeve portion in the form of a cylindrical shell having an inner diameter, an outer diameter, an upper portion, and a flat lower portion wherein said outer sleeve portion is coextensively disposed about a predominant amount of said base portion along its length dimension and wherein said lower portion of said sleeve portion extends beyond the flat surface portion of said bottom portion of said core portion, and further comprising a bevel annularly disposed about the inner diameter portion of the lower portion of said sleeve portion,
wherein said top portion of said tower portion includes a first hole drilled in its center along the centerline of said core portion, and wherein said flat surface portion includes a second hole drilled at its center along the centerline of said core portion, said first hole and said second hole not drilled through to one another.

7. An electrode according to claim 6 wherein said outer sleeve portion extends beyond said bottom surface of said core portion a distance between 0.10 inches and 2.00 inches, including every hundredth inch therebetween.

8. An electrode according to claim 6 wherein said core portion comprises copper.

9. An electrode according to claim 6 wherein said outer sleeve portion comprises a polymeric material.

10. An electrode according to claim 6 wherein said core portion includes a hollow passage which is adapted to receive a liquid coolant.

11. A process for attaching a welding nut to a substrate comprising the steps of:

a) providing an electrode according to claim 1 in contact with a first pole of a source of electrical current;

b) providing a substrate, wherein said substrate is in electrical contact with a pole of a source of electrical current that is complementary to said first pole;

c) providing a weld nut wherein said weld nut includes a top surface portion and a bottom surface portion and wherein said bottom surface portion is in electrical contact with said substrate;

d) causing the bottom surface portion of said electrode to contact said top surface portion of said weld nut; and d) causing sufficient electrical current to flow through said weld nut to cause said weld nut to become adhered to said substrate.

12. A process according to claim 11 wherein said weld nut includes at least one projection on its bottom surface.

13. A process according to claim 11 wherein said source of electrical current is selected from the group consisting of: direct current or alternating current.

14. A process according to claim 11 wherein said substrate comprises sheet metal.

15. A process according to claim 11 wherein said substrate comprises sheet metal that is to be employed as a portion of a finished automobile.

16. A process for attaching a welding nut to a substrate comprising the steps of:

a) providing an electrode according to claim 6 in contact with a first pole of a source of electrical current;

b) providing a substrate, wherein said substrate is in electrical contact with a pole of a source of electrical current that is complementary to said first pole;

c) providing a weld nut, wherein said weld nut includes a top surface portion and a bottom surface portion and wherein said bottom surface portion is in electrical contact with said substrate;

d) causing the bottom surface portion of said electrode to contact said top surface portion of said weld nut; and d) causing sufficient electrical current to flow through said weld nut to cause said weld nut to become adhered to said substrate.

17. A process according to claim 16 wherein said weld nut includes at least one projection on its bottom surface.

18. A process according to claim 16 wherein said source of electrical current is selected from the group consisting of: direct current or alternating current.

19. A process according to claim 16 wherein said substrate comprises sheet metal.

20. A process according to claim 16 wherein said substrate comprises sheet metal that is to be employed as a portion of a finished automobile.

21. In a process for affixing a weld nut to a metallic substrate using an upper electrode designed to contact the top surface of a weld nut that is in contact with said substrate, wherein the improvement comprises providing said upper electrode with an outer sleeve portion that is effectively configured to preclude the passage of electrical current through any path other than through the weld nut itself.

* * * * *